US012704819B2

(12) United States Patent
Botero Halblaub et al.

(10) Patent No.: US 12,704,819 B2
(45) Date of Patent: Aug. 11, 2026

(54) CONTROL OF A TECHNICAL SYSTEM BY MEANS OF A COMPUTING UNIT FOR ARTIFICIAL INTELLIGENCE

(71) Applicant: Siemens Aktiengesellschaft, Munich (DE)

(72) Inventors: Andrés Botero Halblaub, Kirchseeon (DE); Christoph Wincheringer, Munich (DE); Tim Schenk, Landshut (DE); Ingo Thon, Grasbrunn (DE)

(73) Assignee: Siemens Aktiengesellschaft, Munich (DE)

( * ) Notice: Subject to any disclaimer, the term of this patent is extended or adjusted under 35 U.S.C. 154(b) by 540 days.

(21) Appl. No.: 18/024,520

(22) PCT Filed: Aug. 27, 2021

(86) PCT No.: PCT/EP2021/073741

§ 371 (c)(1),
(2) Date: Mar. 3, 2023

(87) PCT Pub. No.: WO2022/058140

PCT Pub. Date: Mar. 24, 2022

(65) Prior Publication Data

US 2023/0324856 A1 Oct. 12, 2023

(30) Foreign Application Priority Data

Sep. 15, 2020 (EP) .................................... 20196314

(51) Int. Cl.
*G06N 3/082* (2023.01)
*G05B 13/02* (2006.01)

(52) U.S. Cl.
CPC .......... *G05B 13/027* (2013.01); *G06N 3/082* (2013.01)

(58) Field of Classification Search
CPC ....... G05B 13/027; G05B 19/05; G06N 3/082
See application file for complete search history.

(56) References Cited

U.S. PATENT DOCUMENTS 6,647,301 B1 11/2003 Sederlund et al.
9,164,796 B2 * 10/2015 Andrianiaina ............ G06F 9/50
(Continued)

FOREIGN PATENT DOCUMENTS

CN 1353834 A 6/2002
CN 101866159 A 10/2010
(Continued)

OTHER PUBLICATIONS

Anonymous; "Worst-case execution time—Wikipedia"; InternetArchiveBot(talk I contribs); Feb. 13, 2020 (Feb. 13, 2020); XP055792286; URL:https://en.wikipedia.org/w/index.phptitle=Worst-case_execution_time&oldid=940578081.
(Continued)

*Primary Examiner* — Scott T Baderman
*Assistant Examiner* — Mario M Velez-Lopez
(74) *Attorney, Agent, or Firm* — Schmeiser Olsen PLLC

(57) ABSTRACT

A computer-implemented method for controlling a technical system is provided, including: —reading in hardware configuration parameters and a value of a real-time requirement of a control unit, —reading in hardware configuration parameters of a computing unit for artificial intelligence, —reading in a control application for controlling the technical system, the control application being configured to generate an input value for the control unit in accordance with an artificial intelligence, —determining a processing time of the control application for execution of the control application on the computing unit for artificial intelligence, considering the hardware configuration parameters of the control unit and the hardware configuration parameters of (Continued)

the computing unit for artificial intelligence, —checking the determined processing time based on the value of the real-time requirement of the control unit and outputting a check result, and —the control application, depending on the check result, for the control of the technical system.

9 Claims, 3 Drawing Sheets

(56) References Cited

U.S. PATENT DOCUMENTS

| | | | | |
|---|---|---|---|---|
| 12,013,676 | B2 * | 6/2024 | Claussen | G05B 19/41835 |
| 2005/0086645 | A1 | 4/2005 | Diao et al. | |
| 2010/0268358 | A1 | 10/2010 | Cantarelli et al. | |
| 2013/0219402 | A1 * | 8/2013 | Andrianiaina | G06F 11/008 718/104 |
| 2014/0165021 | A1 | 6/2014 | Pattichis et al. | |
| 2018/0329942 | A1 | 11/2018 | Kawanoue | |
| 2019/0041824 | A1 | 2/2019 | Chavez et al. | |
| 2019/0041830 | A1 | 2/2019 | Yarvis et al. | |
| 2020/0234146 | A1 * | 7/2020 | Lee | G06N 3/063 |
| 2020/0254609 | A1 * | 8/2020 | Claussen | G05B 19/05 |
| 2020/0257506 | A1 | 8/2020 | Yoshiyama et al. | |
| 2021/0019657 | A1 | 1/2021 | Wu et al. | |
| 2021/0117231 | A1 * | 4/2021 | Pan | G06N 3/06 |
| 2021/0263493 | A1 | 8/2021 | Claussen | |
| 2022/0019200 | A1 * | 1/2022 | Drews | G05B 19/41835 |

FOREIGN PATENT DOCUMENTS

| | | | |
|---|---|---|---|
| CN | 110516240 | A | 11/2019 |
| CN | 111279278 | A | 6/2020 |
| CN | 111325224 | A | 6/2020 |
| CN | 111339027 | A | 6/2020 |
| CN | 111420844 | A | 7/2020 |
| CN | 112805627 | A | 5/2021 |
| CN | 113872323 | * | 12/2021 |
| EP | 2568346 | A1 | 3/2013 |
| EP | 3637354 | A | 4/2020 |
| EP | 3657277 | A1 | 5/2020 |
| JP | H04180152 | A | 6/1992 |
| JP | 2019139792 | A | 8/2019 |
| JP | 2019212146 | A | 12/2019 |
| KR | 20050037349 | A | 4/2005 |
| KR | 20200020117 | A | 2/2020 |
| KR | 20200088803 | A | 7/2020 |
| WO | 2019136756 | A1 | 7/2019 |
| WO | 2020108303 | A1 | 6/2020 |

OTHER PUBLICATIONS

PCT International Search Report of International Searching Authority mailed Nov. 11, 2021 corresponding to PCT International Application No. PCT/EP2021/073741 filed Aug. 27, 2021.

* cited by examiner

S1
S2
S3
S4, S4a, S4b
S5
S7
N
Y
S6
S10

S1
S2
S3
S4, S4a, S4b
S9
S8
S5
N
Y
S6
S10

CONTROL OF A TECHNICAL SYSTEM BY MEANS OF A COMPUTING UNIT FOR ARTIFICIAL INTELLIGENCE

CROSS-REFERENCE TO RELATED APPLICATIONS

This application claims priority to PCT Application No. PCT/EP2021/073741, having a filing date of Aug. 27, 2021, which claims priority to EP Application No. 20196314.7, having a filing date of Sep. 15, 2020, the entire contents both of which are hereby incorporated by reference.

FIELD OF TECHNOLOGY

The following relates to a computer-implemented method for controlling a technical system, to a device for controlling a technical system and to a control system comprising an artificial intelligence (AI) computing unit.

BACKGROUND

To accelerate specialized computations, such as for example deep learning inference with artificial neural networks, it is possible to use specialized system-on-a-chip solutions, what are known as AI accelerators, which may also be referred to as an artificial intelligence (AI) computing unit or neural processor or neural processing unit (NPU for short).

Since such AI-based algorithms are increasingly also being used in industrial automation, such specialized AI computing units may also be integrated into industrial controllers for controlling industrial installations or machines.

EP 3 657 277 A1 describes an extension unit for an automation device of an industrial system, wherein the extension unit is configured to carry out a data evaluation on the basis of an artificial intelligence.

In contrast to the typical fields of application for AI accelerators, the algorithms in industrial automation however generally have to comply with strict real-time requirements, such as for example a maximum cycle time of a programmable logic controller (PLC), which is typically not provided by such a specialized artificial intelligence computing unit, meaning that only incorporation into non-real-time-critical control flows is possible.

SUMMARY

An aspect relates to enabling incorporation of an artificial intelligence computing unit/an AI accelerator into real-time-critical control flows.

According to a first aspect, embodiments of the invention relate to a computer-implemented method for controlling a technical system, comprising the following method steps:

reading in hardware configuration parameters and a value of a real-time requirement of a control unit, reading in hardware configuration parameters of an artificial intelligence computing unit, reading in a control application for controlling the technical system, wherein the control application is configured to generate an input value for the control unit on the basis of an artificial intelligence, determining a processing time of the control application for execution of the control application on the artificial intelligence computing unit taking into consideration the hardware configuration parameters of the control unit and the hardware configuration parameters of the artificial intelligence computing unit, checking the determined processing time on the basis of the value of the real-time requirement of the control unit and outputting a check result, and outputting the control application for controlling the technical system on the basis of the check result.

The method may in particular be at least partially computer-aided or computer-implemented. "Computer-aided" in connection with embodiments of the invention may be understood to mean for example an implementation of the method in which in particular a processor executes at least one method step of the method. A processor in connection with embodiments of the invention may be understood to mean for example a machine or an electronic circuit. A processor may in particular be a central processing unit (CPU), a microprocessor or a microcontroller, for example an application-specific integrated circuit or a digital signal processor, possibly in combination with a storage unit for storing program instructions, etc. A processor may also for example be an IC (integrated circuit), in particular an FPGA (field-programmable gate array) or an ASIC (application-specific integrated circuit), or a DSP (digital signal processor) or a graphic processing unit (GPU). A processor may also be understood to mean a virtualized processor, a virtual machine or a soft CPU. It may also be for example a programmable processor that is equipped with configuration steps for executing the stated method according to embodiments of the invention or is configured with configuration steps such that the programmable processor implements the inventive features of the method, the component, the modules, or other aspects and/or sub-aspects of embodiments of the invention.

Unless stated otherwise in the following description, the terms "perform", "compute", "computer-aided", "calculate", "establish", "generate", "configure", "reconstruct" and the like refer to operations and/or processes and/or processing steps that change and/or generate data and/or convert data into other data, wherein the data are represented or may be present in particular as physical variables, for example as electrical pulses. The expression "computer" should in particular be interpreted as broadly as possible in order to cover in particular all electronic devices with data processing capabilities. Computers may thus be for example personal computers, servers, programmable logic controllers (PLC), hand-held computer systems, pocket PC devices, mobile radio devices and other communication devices that are able to process data in a computer-aided manner, processors and other electronic data processing devices.

"Provision", in particular in connection with data and/or information, in connection with embodiments of the invention may be understood to mean for example computer-aided provision. The provision takes place for example via an interface, such as for example a network interface, a communication interface or an interface to a storage unit. Such an interface may be used for example to transmit and/or send and/or retrieve and/or receive corresponding data and/or information during the provision.

A "hardware configuration parameter of a control unit" in connection with embodiments of the invention may be understood to mean for example a PLC type, such as for example type and parameter of the backplane bus, number and assembly types, etc.

A "real-time requirement" in connection with embodiments of the invention may be understood to mean a time interval or point in time for a process of the control unit in which or at which the process is intended to take place. A "value of a real-time requirement" may accordingly be such a condition in a unit of time.

"Control application" in connection with embodiments of the invention may be understood to mean in particular a software application that is suitable for controlling a technical system, that is to say that provides for example at least one input value for a control unit of a technical system. The control application is configured to generate an input value for the control unit on the basis of an artificial intelligence. In other words, it may in this case be an AI-based control application. By way of example, the artificial intelligence is implemented as an artificial neural network, such that, when the control application is read in, in particular a respective number and type of input nodes and output nodes of the artificial neural network are read in.

An "artificial intelligence computing unit" in connection with embodiments of the invention may be understood to mean in particular an AI accelerator or a neural processing unit. Such a computing unit is a computing unit that is suitable specifically for computing on the basis of an artificial intelligence, that is to say a specific computing unit for AI or a computing unit that is suitable for executing an AI-based application. In other words, the computing unit may in particular be assigned to an AI computation, such as for example a computation using an artificial neural network.

A "hardware configuration of the artificial intelligence computing unit" in connection with embodiments of the invention may be understood to mean in particular information about the hardware components of the computing unit/NPU assembly, such as for example processor clocking, memory clocking, and/or bandwidth of the buses.

A "processing time" may in particular also be understood to mean processing duration, total computing time, total execution time, or performance time with regard to the execution of the control application on the AI computing unit.

Embodiments of the invention make it possible to check whether the control application meets a real-time requirement of the control unit. In this case, a check is in particular performed to determine whether the real-time requirement is complied with when executing the AI-based control application on the artificial intelligence computing unit. One advantage of embodiments of the present invention is that it is possible to determine, for a control application executed on an artificial intelligence computing unit/an AI accelerator, whether this is able to be used to control or is suitable for controlling a real-time-critical system. This is checked in particular specifically for the corresponding hardware.

In one embodiment, the processing time may comprise:

- a transmission time for a data transmission between the control unit and the artificial intelligence computing unit and/or
- an execution time of the execution of the application on the artificial intelligence computing unit.

In one embodiment, the execution time may be determined by way of a computer-aided simulation of the execution of the control application on the artificial intelligence computing unit.

A CPU simulation may for example be used for this purpose. The cache behavior may also be taken into consideration in the process.

In one alternative embodiment, the execution time may be determined by way of executing the control application on the artificial intelligence computing unit.

It is also possible to determine the processing time through a direct measurement. This makes it possible to take into consideration any properties of the specific computing unit.

In one embodiment, on the basis of the check result,

- the value of the real-time requirement of the control unit may be adapted to the determined processing time, and/or
- the execution time of the control application may be adapted to the value of the real-time requirement by modifying the control application.

This makes it possible either to revise a real-time criterion and/or to adapt the control application to the corresponding hardware.

In one embodiment, the control application may be modified iteratively until the determined execution time of the control application meets the value of the real-time requirement of the control unit.

The control application may in particular be modified by way of an optimization process, wherein the control application is adapted iteratively until the execution time is minimized.

In one embodiment, the control application may comprise an artificial neural network and nodes of the neural network may be reduced iteratively until the determined execution time of the control application meets the value of the real-time requirement.

This makes it possible for example to remove nodes of the artificial neural network that have a low weighting. This may be determined for example through sensitivity analysis. This makes it possible, such as for example in sensitivity analysis, to use excitation of the input signals to investigate the neural network as to the extent to which a node contributes to the output of the computation. Those nodes with low influence may be ignored.

In one embodiment, the control application may be executed on the artificial intelligence computing unit, an input value thereby being generated for the control unit and the technical system being controlled on the basis of the input value.

The control application may in particular be executed in the event of a positive check result, that is to say when the processing time meets the real-time requirement.

According to a further aspect, embodiments of the invention relate to a device for controlling a technical system comprising:

- a first interface that is configured to read in hardware configuration parameters and a value of a real-time requirement of a control unit,
- a second interface that is configured to read in hardware configuration parameters of an artificial intelligence computing unit,
- a third interface that is configured to read in a control application for controlling the technical system, wherein the control application is configured to generate an input value for the control unit on the basis of an artificial intelligence,
- an analysis module that is configured to determine a processing time of the control application for execution of the control application on the artificial intelligence computing unit in order to generate an input value for the control unit taking into consideration the hardware configuration parameters of the control unit and the hardware configuration parameters of the artificial intelligence computing unit, a checking module that is configured to check the determined processing time on the basis of the value of the real-time requirement of the control unit and to output a check result, and an output module that is configured to output the control application for controlling the technical system on the basis of the check result.

The device and/or at least one of its interfaces or modules may in particular be configured in the form of hardware and/or software. The device comprises at least one processor. The device is coupled to the control unit of the technical system and to the artificial intelligence computing unit.

In one embodiment, the device may comprise a simulation module that is configured to determine an execution time by way of a computer-aided simulation of the execution of the control application on the artificial intelligence computing unit.

A "simulation module" may also be understood to mean a simulation environment.

In one embodiment, the device may comprise an optimization module that is configured to iteratively modify the control application until the determined execution time of the control application meets the value of the real-time requirement of the control unit.

The optimization module involves an optimization process by way of which the control application is able to be iteratively modified such that the execution time of the control application is minimized. The optimization module is coupled at least to the analysis module and to the checking module such that the control application is able to be iteratively modified and checked until the execution time meets the real-time requirement.

According to a further aspect, embodiments of the invention relate to a control system comprising:

a device according to embodiments of the invention, an artificial intelligence computing unit that is configured to execute a control application for controlling the technical system, wherein the control application is configured to generate an input value for the control unit on the basis of an artificial intelligence, the control unit, which is configured to control the technical system on the basis of the input value generated by the control application.

Embodiments of the invention furthermore relate to a computer program product (non-transitory computer readable storage medium having instructions, which when executed by a processor, perform actions) that is able to be loaded directly into a programmable computer and comprises program code portions that, when the program is executed by a computer, prompt the computer to execute the steps of a method according to embodiments of the invention.

A computer program product may for example be provided or supplied on a storage medium, such as for example memory card, USB stick, CD-ROM, DVD, a nonvolatile/non-transitory storage medium, or else in the form of a file downloadable from a server in a network.

BRIEF DESCRIPTION

Some of the embodiments will be described in detail, with reference to the following figures, wherein like designations denote like members, wherein.

DETAILED DESCRIPTION

The following exemplary embodiments in particular show only exemplary implementation options as to how in particular such implementations of the teaching according to embodiments of the invention could look, since it is impossible and also not expedient or necessary for the understanding of embodiments of the invention to cite all of these implementation options.

A (relevant) person skilled in the conventional art having knowledge of the one or more method claims is in particular also obviously aware of all of the options for implementing embodiments of the invention that are routine in the conventional art, meaning that a stand-alone disclosure thereof is in particular not required in the description.

Figure 1:
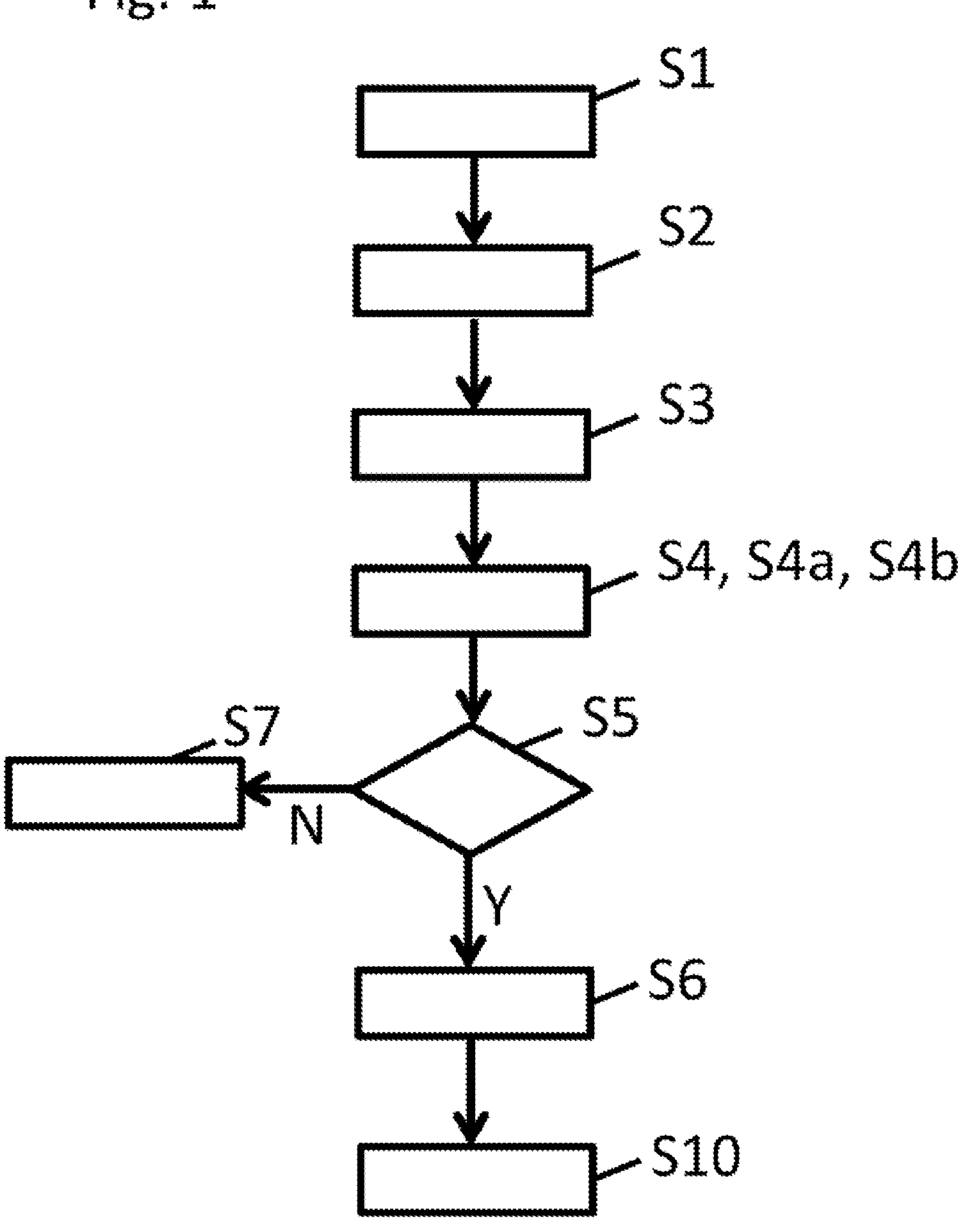
FIG. 1 shows a first exemplary embodiment of the method.

FIG. 1 shows one exemplary embodiment of the method according to the invention for controlling a technical system in the form of a flowchart. The technical system may in this case for example be an industrial installation, such as for example a production installation, an automation device or a robotic system. The technical system may in particular be controlled with the aid of a control application based on a machine learning method/machine learning algorithm, wherein the control application outputs an input value for a control unit of the technical system. To this end, the control unit is coupled to an artificial intelligence computing unit, wherein the control application is executed on the artificial intelligence computing unit.

The control of the technical system may have a real-time requirement that the control application has to comply with when it is executed on the artificial intelligence computing unit. This may be checked by way of the method described below, such that the control application for controlling the technical system is able to be authorized and/or executed.

In the first step S1 of the method, a hardware configuration or hardware specification of the control unit is acquired. To this end, hardware configuration parameters of the control unit, such as for example the PLC type, memory size, memory speed, and/or bus bandwidth, are read in. At least one value of a real-time requirement, that is to say for example a temporal upper limit, for a control process is also read in. The real-time requirement may for example be ascertained on the basis of the hardware configuration.

In the next step S2, hardware configuration parameters of the artificial intelligence computing unit, such as for example type, computing power, NPU clocking/size, internal bus speed and/or bandwidth, are read in.

Information about firmware and/or software of the artificial computing intelligence unit and/or of the control unit may furthermore also be read in.

In the next step S3, a control application that is suitable for controlling the technical system is read in. The control application is configured to generate and output an input value for the control unit on the basis of an artificial intelligence, for example an artificial neural network. In other words, the control application is based on an artificial intelligence. The control application is furthermore configured for execution on the artificial intelligence computing unit.

In the next step S4, a processing time, a maximum or minimum processing time, for execution of the control application on the artificial intelligence computing unit is determined, wherein the hardware configuration parameters of the artificial intelligence computing unit and the hardware configuration parameters of the control unit are taken into consideration, that is to say the computation of the processing time is ascertained specifically for these hardware configuration parameters. The firmware and/or software of the artificial intelligence computing unit and/or of the control unit may optionally also be taken into consideration.

The processing time in this case comprises a transmission time for a data transmission between the control unit and the artificial intelligence computing unit and/or an execution time of the execution of the application on the artificial intelligence computing unit. In other words, the processing time is the sum of the transmission time and the execution time. The processing time in particular indicates the time that is required for execution of the control application and transmission of the output input value to the control unit.

The execution time may in particular be determined by way of a computer-aided simulation, step S4*a*, of the execution of the control application on the artificial intelligence computing unit, wherein the artificial intelligence computing unit is represented/modeled on the basis of the hardware configuration parameters. As an alternative, the execution time may also be determined directly by executing the control application on the real artificial intelligence computing unit, step S4*b*.

A maximum transmission time between a function block of the control unit and the NPU assembly comprises the request and the response between these components. For example, a gross transmission time on a backplane bus (including maximum waiting time from the bus request to the bus grant of the bus arbitration control), a maximum clock skew in transitions between different clock domains of the hardware and a maximum response time of the interrupt service routines of the control system and of the NPU assembly are added together.

The maximum execution time on the NPU assembly comprises for example a maximum execution time of Atom code segments (without incoming/outgoing branches). These may for example be computed or simulated through static worst-case execution time analysis. In this case, at the beginning of the code segment, all caches should be assumed to be "cold", that is to say to contain none of the required cache lines. The possible computations may be executed in parallel on different resources. In the case of full parallelizability, the longest path in a dataflow graph of the control application or the artificial intelligence of the control application thus constitutes the uppermost limit of the execution time.

In the next step S5, it is checked whether the determined processing time meets the real-time requirement of the control unit. To this end, the determined processing time is compared with the at least one value of the real-time requirement.

If the processing time meets the real-time requirement of the control unit, path Y, then the control application for controlling the technical system is output, step S6 and step S10. To this end, control application may be configured and executed on the artificial intelligence computing unit, wherein the control application generates an input value for the control unit. The control unit is able to control the technical system on the basis of this input value, step S10.

If the processing time does not meet the real-time requirement of the control unit, path N, then the real-time requirement may for example be adapted, step S7. By way of example, an upper limit for the processing time may be modified accordingly. Another check on the processing time may then be performed on the basis of the modified real-time requirements. This makes it possible to adapt a control system of the technical system such that it is possible to use a predefined AI-based control application.

Figure 2:
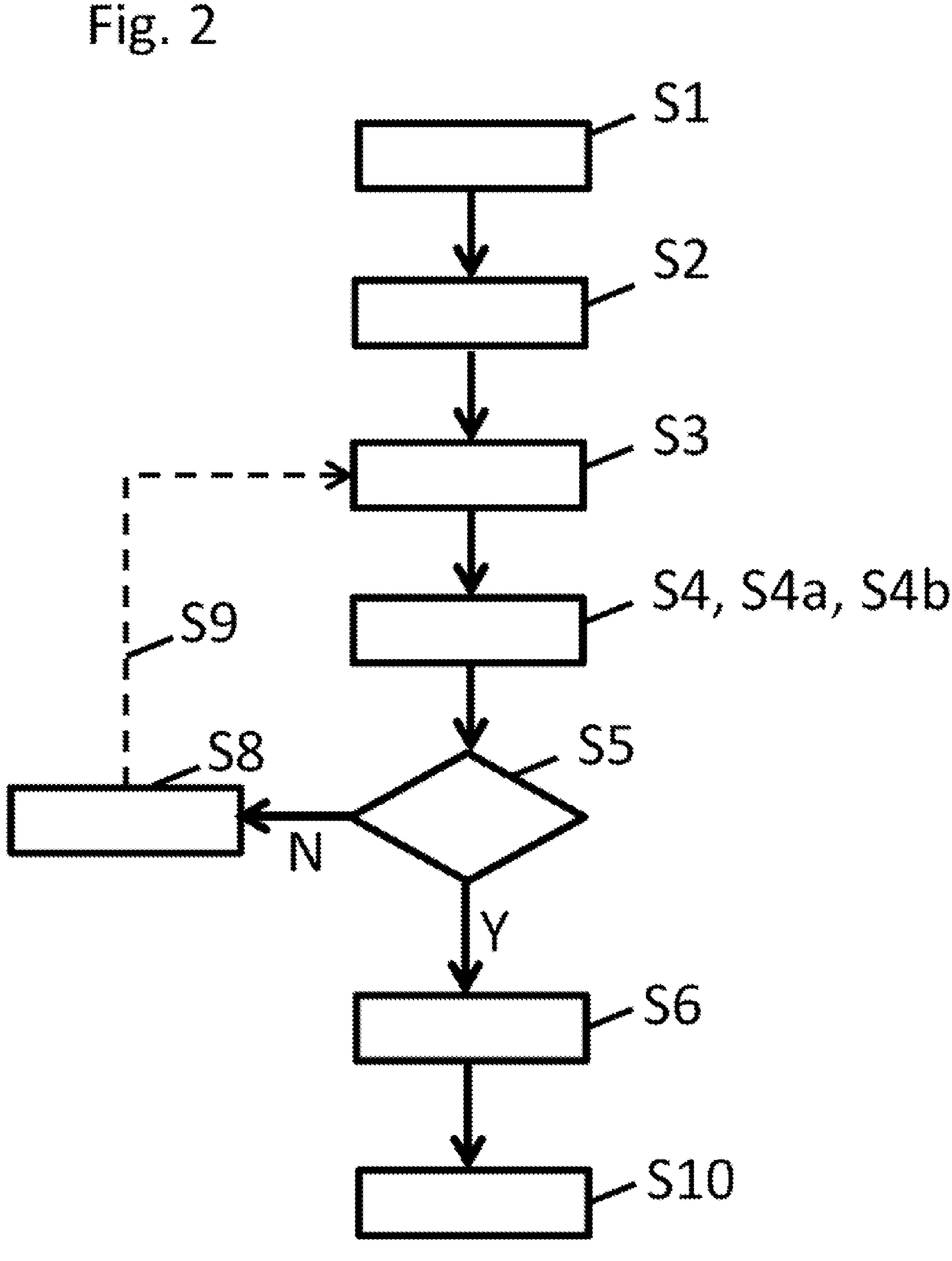
FIG. 2 shows a second exemplary embodiment of the method.

FIG. 2 shows a further exemplary embodiment of the method according to the invention for controlling a technical system. Steps S1 to S6 and S10 correspond to those in FIG. 1.

If the check on the processing time, step S5, reveals that the processing time does not meet the real-time requirement of the control unit of the technical system, path N, then, in addition or as an alternative to adapting the real-time requirement (step S7 in FIG. 1), the control application may be modified, step S8, so that the execution time of the control application is adapted to the value of the real-time requirement.

To this end, the control application may be adapted iteratively, step S9, until the resulting execution time meets the real-time requirement. By way of example, the control application may comprise an artificial neural network, such that nodes of the neural network are reduced iteratively until the determined execution time of the control application meets the value of the real-time requirement. This may for example be supported by an optimization process, wherein the artificial neural network is changed/adapted/reduced, for example by iteratively removing or adding nodes, until the execution time determined therefor corresponds at most to a maximum cycle time of the control unit. By way of example, a respective sensitivity analysis may be performed on the respective nodes for this purpose in order to eliminate those nodes with low weighting.

Figure 3:
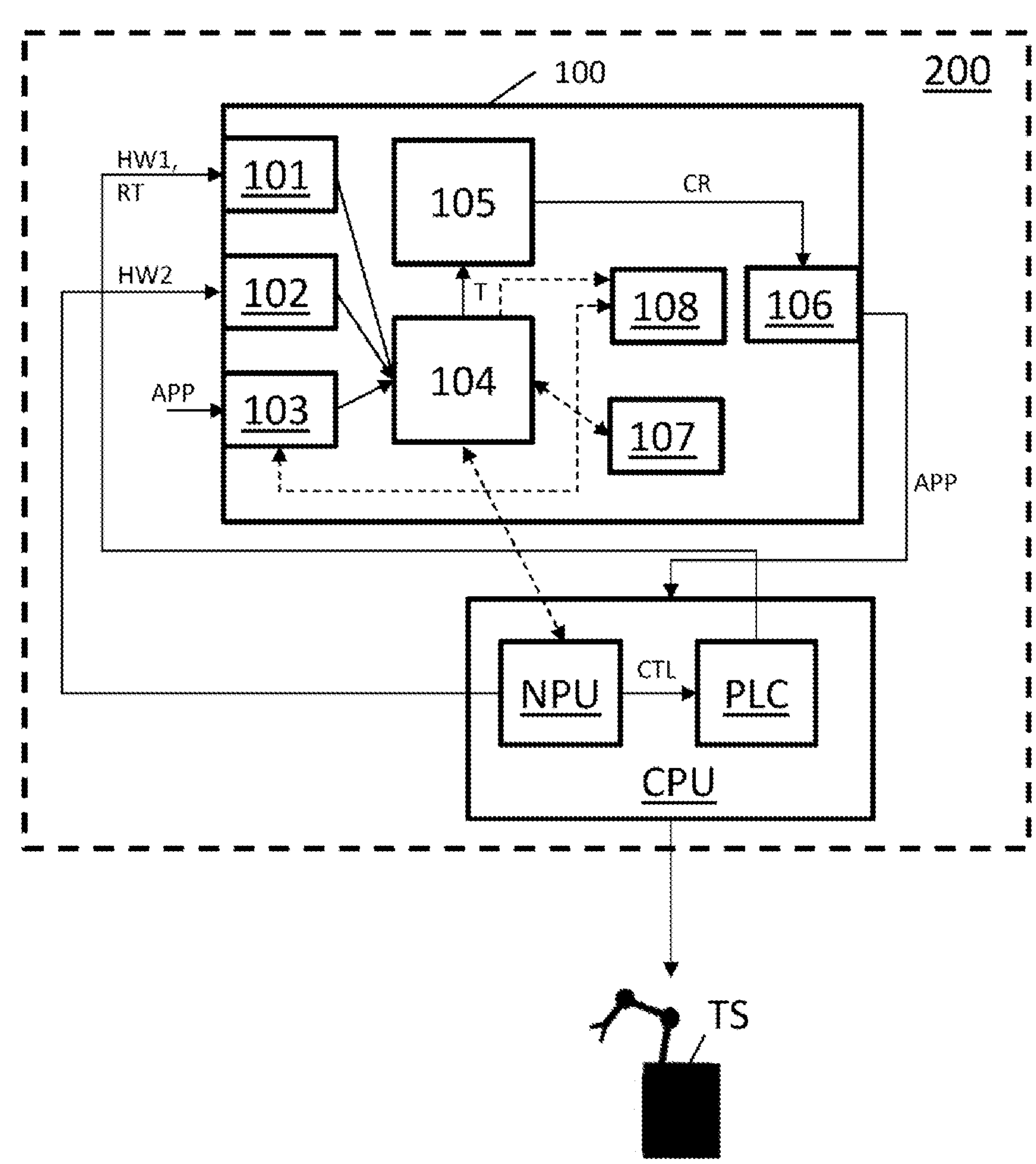
FIG. 3 shows one exemplary embodiment of the device and of the control system.

FIG. 3 shows one exemplary embodiment of the device 100 according to the invention and of the control system 200 according to embodiments of the invention for controlling a technical system TS. The device 100 may for example be coupled to the control system 200 or integrated therein. The device 100 is configured to execute the steps of the method as shown in FIGS. 1 and/or 2.

The control system 200 is shown, which comprises the device 100, an artificial intelligence computing unit NPU, such as for example a neural processing unit, and a control unit PLC. The technical system may for example be an image-controlled robotic system that is able to be controlled on the basis of a machine learning algorithm. The control system 200 comprises at least one processor CPU that centrally processes data from the neural processing unit NPU and from the control unit PLC.

The device 100 comprises a first interface 101 that is configured to read in hardware configuration parameters HW1 and a value of a real-time requirement RT of the control unit PLC, and a second interface 102 that is configured to read in hardware configuration parameters HW2 of the artificial intelligence computing unit NPU. The device 100 furthermore comprises a third interface 103 that is configured to read in a control application APP for controlling the technical system. The control application APP is configured to generate an input value for the control unit on the basis of an artificial intelligence. The device 100 furthermore comprises an analysis module 104 that is configured to determine a processing time T of the control application for execution of the control application APP on the artificial intelligence computing unit NPU in order to generate an input value for the control unit taking into consideration the hardware configuration parameters HW1 of the control unit and the hardware configuration parameters HW2 of the artificial intelligence computing unit. The device furthermore comprises a checking module 105 that is configured to check the determined processing time T on the basis of the value of the real-time requirement of the control unit and to output a check result CR, and an output module 106 that is configured, in the event of a positive check result, to output the control application APP for controlling the technical system TS. The check comprises for example a comparison of the processing time with the value of the real-time requirement. The check result is in particular positive when the processing time T of the control application APP meets the real-time requirement RT of the control unit PLC.

The processing time T is determined by way of a computer-aided simulation, for example a CPU simulation, of the execution of the control application APP on the neural processing unit NPU. To this end, the device 100 may comprise a simulation module 107 that is configured to perform such a computer-aided simulation. The simulation module 107 is coupled to the analysis module 104. For the computation, the hardware configuration parameters HW2 of the neural processing unit NPU are in particular transmitted to the simulation module 107, such that it is possible to perform a specific computer-aided simulation for this neural processing unit NPU.

If the control application APP meets the real-time requirements RT of the control unit, the control application is executed on the neural processing unit NPU and delivers an input value CTL for the control unit PLC for controlling the technical system TS.

If the checking module 105 outputs a negative check result, that is to say if the processing time T of the control application APP does not meet the real-time requirement RT, an optional optimization module 108 may be used to optimize the execution time of the control application until the real-time requirement RT is met. The optimization module 108 is configured to iteratively modify the control application APP until the determined execution time of the control application meets the value of the real-time requirement of the control unit. By way of example, a machine learning model on which the control application APP is based may be reduced, wherein for example nodes of an artificial neural network are removed.

Although the present invention has been disclosed in the form of embodiments and variations thereon, it will be understood that numerous additional modifications and variations could be made thereto without departing from the scope of the invention.

For the sake of clarity, it is to be understood that the use of "a" or "an" throughout this application does not exclude a plurality, and "comprising" does not exclude other steps or elements.

The invention claimed is:

1. A computer-implemented method for controlling a technical system, comprising the following:

reading in hardware configuration parameters and a value of a real-time requirement of a control unit, wherein the real-time requirement of the control unit includes a temporal upper limit for a control process;

reading in hardware configuration parameters of an artificial intelligence computing unit;

reading in a control application for controlling the technical system, wherein the control application is configured to generate an input value for the control unit on the basis of an artificial intelligence, wherein the control application is configured for execution on the artificial intelligence computing unit;

determining a processing time of the control application for execution of the control application on the artificial intelligence computing unit taking into consideration the hardware configuration parameters of the control unit and the hardware configuration parameters of the artificial intelligence computing unit, wherein the processing time comprises an execution time of the execution of the application on the artificial intelligence computing unit and a transmission time for a data transmission between the control unit and the artificial intelligence computing unit, such that the processing time indicates a total time required for execution of the control application and transmission of an output input value to the control unit;

checking the determined processing time of the control application for execution of the control application on the artificial intelligence computing unit on the basis of the value of the real-time requirement of the control unit and outputting a check result; and outputting the control application for controlling the technical system on the basis of the check result;

wherein the execution time of the control application is configured to the value of the real-time requirement by modifying the control application, wherein the control application is iteratively modified until the determined execution time of the control application meets the value of the real-time requirement of the control unit; and wherein the control application comprises an artificial neural network and nodes of the neural network are iteratively reduced until the determined execution time of the control application meets the value of the real-time requirement.

2. The computer-implemented method as claimed in claim 1, wherein the execution time is determined by way of a computer-aided simulation of the execution of the control application on the artificial intelligence computing unit.

3. The computer-implemented method as claimed in claim 1, wherein the execution time is determined by way of executing the control application on the artificial intelligence computing unit.

4. The computer-implemented method as claimed in claim 1, wherein on the basis of the check result, the value of the real-time requirement of the control unit is configured to the determined processing time.

5. The computer-implemented method as claimed in claim 1, wherein the control application is executed on the artificial intelligence computing unit, an input value thereby being generated for the control unit and the technical system being controlled on the basis of the input value.

6. A device for controlling a technical system comprising:

at least one processor configured to:

read in hardware configuration parameters and a value of a real-time requirement of a control unit, wherein the real-time requirement of the control unit includes a temporal upper limit for a control process;

read in hardware configuration parameters of an artificial intelligence computing unit;

read in a control application for controlling the technical system, wherein the control application is configured to generate an input value for the control unit on the basis of an artificial intelligence, wherein the control application is configured for execution on the artificial intelligence computing unit;

determine a processing time of the control application for execution of the control application on the artificial intelligence computing unit in order to generate an input value for the control unit taking into consideration the hardware configuration parameters of the control unit and the hardware configuration parameters of the artificial intelligence computing unit, wherein the processing time comprises an execution time of the execution of the application on the artificial intelligence computing unit, and a transmission time for a data transmission between the control unit and the artificial intelligence computing unit, such that the processing time indicates a total time required for execution of the control application and transmission of an output input value to the control unit;

check the determined processing time of the control application for execution of the control application on the artificial intelligence computing unit on the basis of the value of the real-time requirement of the control unit and to output a check result;

output the control application for controlling the technical system on the basis of the check result; and iteratively modify the control application until the determined execution time of the control application meets the value of the real-time requirement of the control unit, wherein the control application comprises an artificial neural network and nodes of the neural network are iteratively reduced until the determined execution time of the control application meets the value of the real-time requirement.

7. The device as claimed in claim 6, wherein the at least one processor is configured to determine an execution time by way of a computer-aided simulation of the execution of the control application on the artificial intelligence computing unit.

8. A control system comprising:

the device as claimed claim 6;

an artificial intelligence computing unit that is configured to execute a control application for controlling the technical system, wherein the control application is configured to generate an input value for the control unit on the basis of an artificial intelligence; and the control unit, which is configured to control the technical system on the basis of the input value generated by the control application.

9. A computer program product, comprising a computer readable hardware storage device having computer readable program code stored therein, said program code executable by a processor of a computer system to implement the method as claimed in claim 1.

* * * * *